United States Patent [19]

Costello et al.

[11] Patent Number: 5,796,807
[45] Date of Patent: *Aug. 18, 1998

[54] TELEPHONE RECYCLING SYSTEM

[76] Inventors: Matthew W. Costello, 7 Myrtle St., Apartment 3, Boston, Mass. 02114; Dan B. Carpenter, 508 Park Pl., Raynham, Mass. 02767; Gerald V. McNabb, 6928 Kenfig Dr., Falls Church, Va. 22042

[*] Notice: This patent issued on a continued prosecution application filed under 37 CFR 1.53(d), and is subject to the twenty year patent term provisions of 35 U.S.C. 154(a)(2).

[21] Appl. No.: 588,835

[22] Filed: Jan. 19, 1996

[51] Int. Cl.⁶ .................................................. H04M 1/64
[52] U.S. Cl. ................................................ 379/67; 379/76
[58] Field of Search ........................ 379/67, 88, 89, 379/74, 75, 76

[56] References Cited

U.S. PATENT DOCUMENTS

| | | | |
|---|---|---|---|
| 3,673,344 | 6/1972 | Smith et al. | 179/100.1 C |
| 3,805,412 | 4/1974 | Lambright et al. | 35/9 |
| 4,320,256 | 3/1982 | Freeman | 179/6.04 |
| 4,602,129 | 7/1986 | Matthews et al. | 379/88 |
| 4,757,267 | 7/1988 | Riskin | 379/113 |
| 4,924,495 | 5/1990 | Richards et al. | 379/127 |
| 4,943,995 | 7/1990 | Daudelin et al. | 379/67 |
| 5,157,714 | 10/1992 | Spicer | 379/89 |
| 5,187,735 | 2/1993 | Herrero Garcia et al. | 379/88 |
| 5,199,062 | 3/1993 | Von Meister et al. | 379/67 |
| 5,414,756 | 5/1995 | Levine | 379/67 |
| 5,444,767 | 8/1995 | Goetcheus et al. | 379/88 |
| 5,446,919 | 8/1995 | Wilkins | 455/6.2 |
| 5,515,421 | 5/1996 | Sikand et al. | 379/67 |

OTHER PUBLICATIONS

Advertisement—with written analysis: "Buy Recycled. And Save.", *Fortune*: 214 (29 Apr. 1996).

Tucker, Tracey, "Enhanced Systems Hello! A Solid Platform For Off–The Shelf & Custom Voice–Processing Applications", *Teleconnect*: 139–142 (Mar. 1992).

"Houston Post's EarthLine Provides Comprehensive Recycling Information", *the 4th Media journal*: 40 (20 Jan. 1992).

"Switch–to–host link helps recyclers conserve energy", *Voice Processing Magazine*: 34 (Oct. 1992).

"Newark begins recycling phone", *Waste Dynamics* (Feb. 1992).

"More Efforts in Recycling Education", *Rcycling Times* [date unknown].

"Update on Recycling Hotlines in the US", *Business and the Environment*: 11 (Oct. 1992).

Bulkeley, William M., "Callers Push Buttons for What They Need", *The Wall Street Journal* (28 Dec. 1992).

Palmer, Thomas, C. Jr., "Traffic tie–up number gets 1,700 calls a day", *The Boston Globe*: 21 [date unknown].

"National recycling referral on tap", *Resource Recycling*: 113 (Apr. 1994).

Wong, Doris Sue, "Fishing hot line entangles governor", *The Boston Globe*: pg and date unknown.

Palmer, Thomas C., Jr., "Tip for commuters: Beginning tomorrow, call first", *The Boston Globe*: 23 and 27 (13 Jan. 1993).

Harney, Kenneth R., "How to price homes, by phone", *The Boston Herald*: 46 (23 Jun. 1995).

"Touch Four Enhances Ameritech's Environmental Touch", *Link*: 15 (Sep. 1991).

(List continued on next page.)

*Primary Examiner*—Fan S. Tsang
*Attorney, Agent, or Firm*—Foley, Hoag & Eliot LLP; Sayoko Blodgett-Ford; Donald W. Muirhead

[57] ABSTRACT

A telephone recycling system answers an incoming telephone call placed by a user, prompts the user to enter a ZIP Code via the user's touchtone telephone keys, and provides the user with a recycling voice message that varies according to the ZIP Code entered by the user. The recycling message is provided directly in response to the ZIP Code without the user having to provide additional input.

20 Claims, 2 Drawing Sheets

OTHER PUBLICATIONS

"The Corrugated Packaging Coucil is launching . . . " Fibre Market News: 13 (3 Mar. 1995).

Abstract: McCarthy, Patrick, "Ventura County News Roundup: Hot line Offers Tips on Recycling Efforts", Los Angeles Times (The Times Mirror Co.) (Dec. 1992).

Coolidge, Shelly D., "In Bay State, Recycling Information Is At Your Fingertips", *The Christian Science Monitor*: (10 Mar. 1994).

Advertisement: "No more theatre busy signals.", [source and date unknown].

Sebastian, Pamela, "Briefs", *The Wall Street Journal*, [date unknown].

Advertisement: "Learn How To Recycle With Sundial", *Baltimore Sun*, [date unknown].

Advertisement: "Environment Call", *Earthworks—Environmental Jobs Magazine*: [date unknown].

Information relating to Reynolds recycling center hotline [source and date unknown].

Advertisement: Kmart, True Value, CVS–with written analysis [sources and dates unknown].

1
TELEPHONE RECYCLING SYSTEM

TECHNICAL FIELD

This application relates to the field of recycling and more particularly to the field of using a telephone information system to provide an efficient and cost-effective means of disseminating recycling information.

BACKGROUND OF THE INVENTION

Recycling activities have increased dramatically in recent years as people have become more environmentally conscious. Although there is a segment of consumers that are prepared to do whatever it takes in order to recycle, the vast majority of the public will recycle only if doing so does not create any particular hardships or undue burdens. Accordingly, many municipalities have set up recycling programs to facilitate collection of used bottles, newspapers, aluminum, et cetera. These programs include pick-ups and/or centralized locations for residents to bring their recyclable material.

In order to take advantage of a municipality's recycling program, a resident needs to have information about the program such as if and when the municipality picks up recyclable materials, hours of operation of any centralized collection areas, and the types of materials that the municipality processes. Unfortunately, it may be difficult for a resident to find this information, either because the resident does not know who or where to contact to obtain this information or because officials in charge of the program are not available to provide information to the resident. It is therefore desirable to provide a systematic and centralized way to distribute this information to users in order to facilitate recycling. One way to provide a recycling information repository is to use a centralized telephone system scheme. Such systems are known in the art, discussed below.

U.S. Pat. No. 5,157,714 to Spicer discloses a method which utilizes a controller interconnected to a conventional telephone system to allow load providers (those in the trucking industry with goods/loads to be moved) to call in and record in memory messages about available loads. The messages are stored in memory at addresses which correspond to the geographical locations of the origin of the loads, and the messages are accessible to solicitors (those with trucks to move the loads) by inputting the area codes for the geographical locations. A solicitor places a telephone call to the system, selects a telephone area code which corresponds to a geographical location of origin where a load will be needed, and listens to a replay from memory of all of the available load messages stored therein. The overall procedure is shown in FIG. 4 of the patent and described in Column 7, Lines 48–68 and Column 8, Lines 1–36. Spicer discloses that the solicitor (i.e., caller) first enters a three-digit area code, then selects a city from that area code and is provided with an appropriate message according to the entries provided therein. In addition, the system disclosed also provides the capability for certain users, such as the load providers, to access the system, enter a password, and delete and/or change the prerecorded messages.

U.S. Pat. No. 3,673,344 to Smith et al. discloses an announcing system for providing a family of recorded announcements, through telephone central office equipment, to one or more telephone subscriber lines. Each announcement selectively includes weather, temperature, or other periodic and aperiodic information segments.

U.S. Pat. No. 4,320,256 to Freeman discloses a verbally interactive telephone interrogation system in which a two-way telephone subscriber network, such as a touchtone type two-way telephone subscriber network, is utilized to enable both telephone call placement and individualized remote variable audio message selection and interrogation of pre-recorded audio messages as well as remote response accumulation. The touchtone type telephone is utilized to call up a multitrack magnetic storage device which provides selectable reproducible conversational audio messages responsive to particular primary reproducible interrogatory message from a plurality of different selectable audio messages stored thereon. A frequency decoder and track selection means is used for decoding tone signal outputs from the touchtone type telephone to accomplish track selection subsequent to the connection of the subscriber to the multitrack magnetic storage device. As disclosed at the bottom of Column 6 and at the top of Column 7, the device includes tracks which contain questions or interrogatory information and other ones of the tracks contain responsive messages. The interrogatory questions are presented to the caller who provides an input and is directed to an appropriate one of the responsive message tracks.

U.S. Pat. No. 4,924,495 to Richards et al. discloses an electronic communication system that utilizes postal ZIP Codes. However, Richards et al. does not appear to be directed to a messaging system or to providing useful information to callers.

U.S. Pat. No. 5,414,756 to Levine discloses a video recorder communication/control system which utilizes the postal ZIP Code of the cable system connected to the video recorder. The user is prompted to enter the ZIP Code of the cable system in order to control the video recorder.

U.S. Pat. No. 4,943,995 to Daudelin et al. discloses a vendor information service that utilizes a voice processing unit for announcing prerecorded information to customers and for recognizing keyed requests. A processor monitors the customer for keyed requests in order to play an appropriate announcement or to set up a connection for the customer for another telephone operator or a vendor attendant.

U.S. Pat. No. 3,805,412 to Lambright et al. is directed to an automated audio interrogating and reporting system. Questions are played from a multi-track magnetic audio question tape and responded to by selectively actuating push buttons representing multiple-choice answers such as "yes", "no", "don't know", and "repeat".

U.S. Pat. No. 5,446,919 to Wilkins discloses a communication system capable of targeting a demographically or psychographically defined audience. Multiple media messages are transmitted to each audience member. A channel selector/decoder unit associated with each member receiver compares the selection profile with the demographic/psychographic information about the audience member and selects the appropriate media message for that audience member.

U.S. Pat. No. 4,757,267 to Riskin discloses a system for automatically connecting a potential customer with a nearby dealer who can provide goods or services desired by the potential customer. The potential customer first dials an "800"-type number which preferably includes digits uniquely characteristic of the product or service desired. A comparison is performed between the telephone number of the potential customer and the data associated with a dealer to find selected dealers nearby to the potential customer. The system then automatically dials the telephone number of the closest dealer, thereby routing the potential customer to a dealer who can provide the products or services of interest to the customer.

Reynolds Metals Company provides a telephone system that gives users the address of the nearest Reynolds aluminum collection center. The user is prompted to enter his or her ZIP Code after which the system provides the user with the address of the nearest center. However, for many areas (and hence many ZIP Codes) there is no Reynolds aluminum collection center nearby. Accordingly, the user is provided with a message indicating that there is no center. Furthermore, the system can only be used for turning in aluminum and in fact only for providing aluminum to Reynolds.

Another system, provided by Recycling Hotline, Inc. in Phoenix, Arizona (sometimes referred to as the "Arizona Recycling Hotline" or "Clean Up, Inc."), allows users to obtain recycling information via a telephone call. The user is first prompted to enter their ZIP Code in order to determine the caller's location. However, following that, the user is prompted with a series of complicated voice menus that ask the user to press certain keys for certain types of recyclables, e.g., "press 1 for aluminum", "press 2 for glass".... Accordingly, this system is fairly unwieldy in that it requires the user to enter separate numbers and listen to separate messages, return to the main menu, or perhaps even telephone again in order to obtain recycling information for different types of recyclable material. In most cases, consumers will have more than one type of recyclable material and so may be discouraged from using the system due to its complexity and unwieldiness.

It is desirable to have a centralized recycling system for providing a user with appropriate recycling information in a simple and efficient manner.

SUMMARY OF THE INVENTION

According to the present invention, a telephone recycling system answers an incoming telephone call placed by a user, prompts the user to enter a ZIP Code via the user's touchtone telephone keys, and provides the user with a recycling voice message that varies according to the ZIP Code entered by the user. The recycling message is provided directly in response to the ZIP Code without the user having to provide additional input. The system may also allow authorized users to telephone the system and modify one or more of the recycling messages. The authorized user may access the message storing means by pressing a predefined key of the user's touchtone telephone, such as an asterisk key, while the user is being provided with the recycling message. The system can be configured such that a particular recycling message is associated with two or more related ZIP Codes.

The system provides a simple and efficient method of dispensing recycling information. The system is easy to use since the recycling information is provided directly once the user enters his or her ZIP Code rather than providing the user with additional information and requiring additional user input in addition to the ZIP Code. Allowing a single message to be provided in connection with two or more ZIP Codes facilitates efficient message storage and avoids a confusing situation where two users from the same town with a single recycling facility receive different and possibly contradictory recycling messages.

DETAILED DESCRIPTION OF THE PREFERRED EMBODIMENTS

Figure 1:
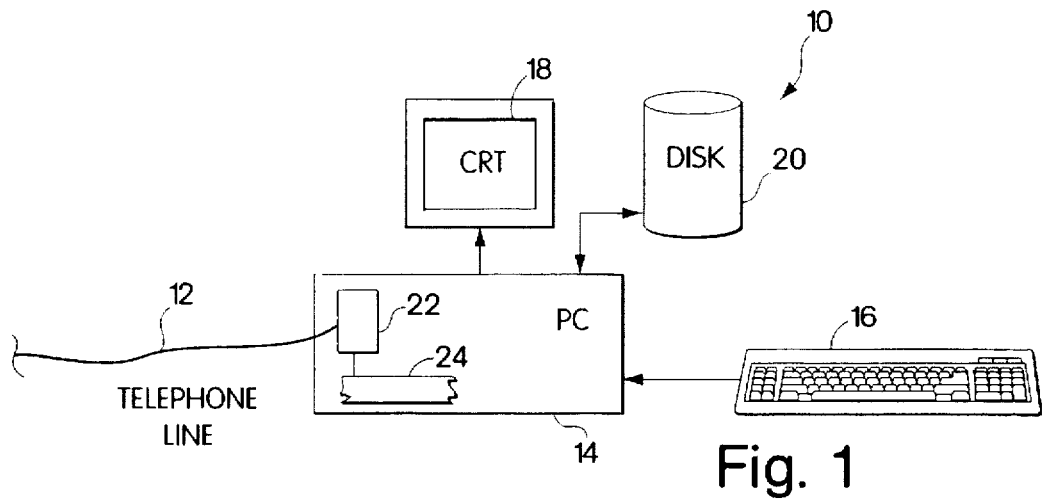
FIG. 1 is a telephone recycling system according to the present invention.

Referring to FIG. 1, a telephone recycling system 10 includes a conventional telephone line 12 connected to a conventional, commercially available, personal computer 14 such as an IBM PC running the DOS operating system. The telephone line 12 is a live telephone line allowing incoming telephone calls. The PC 14 is connected to a conventional keyboard 16, which allows keyed input, and is connected to a CRT 18, which provides screen output. The PC 14 is also connected to a disk 20 which stores software programs and data for the telephone recycling system 10.

The telephone line 12 is connected to an interface board 22 located inside the PC 14. The interface board 22 is electrically connected to an interface bus 24 which provides signals between the interface board 22 and a processor (not shown) of the PC 14 and any other appropriate hardware of the PC 14. The interface board 22 is a conventional telephone line to PC interface board, such as a voice messaging board provided by Dialogic Corporation.

The disk 20 includes software that is executed by the PC 14 in order to provide voice messaging service for the telephone recycling system 10. Software that is appropriate for the particular application described herein is provided by Enhanced Systems of Norcross, Ga. in their Hello! system. The software allows building of scripts that provide voice messaging functionality for the software recycling system 10, as described in detail hereinafter. The scripts are constructed in a conventional manner by following instructions in the manual that is provided with the Hello! system. Recorded voice messages are stored digitally on the disk 20.

Figure 2:
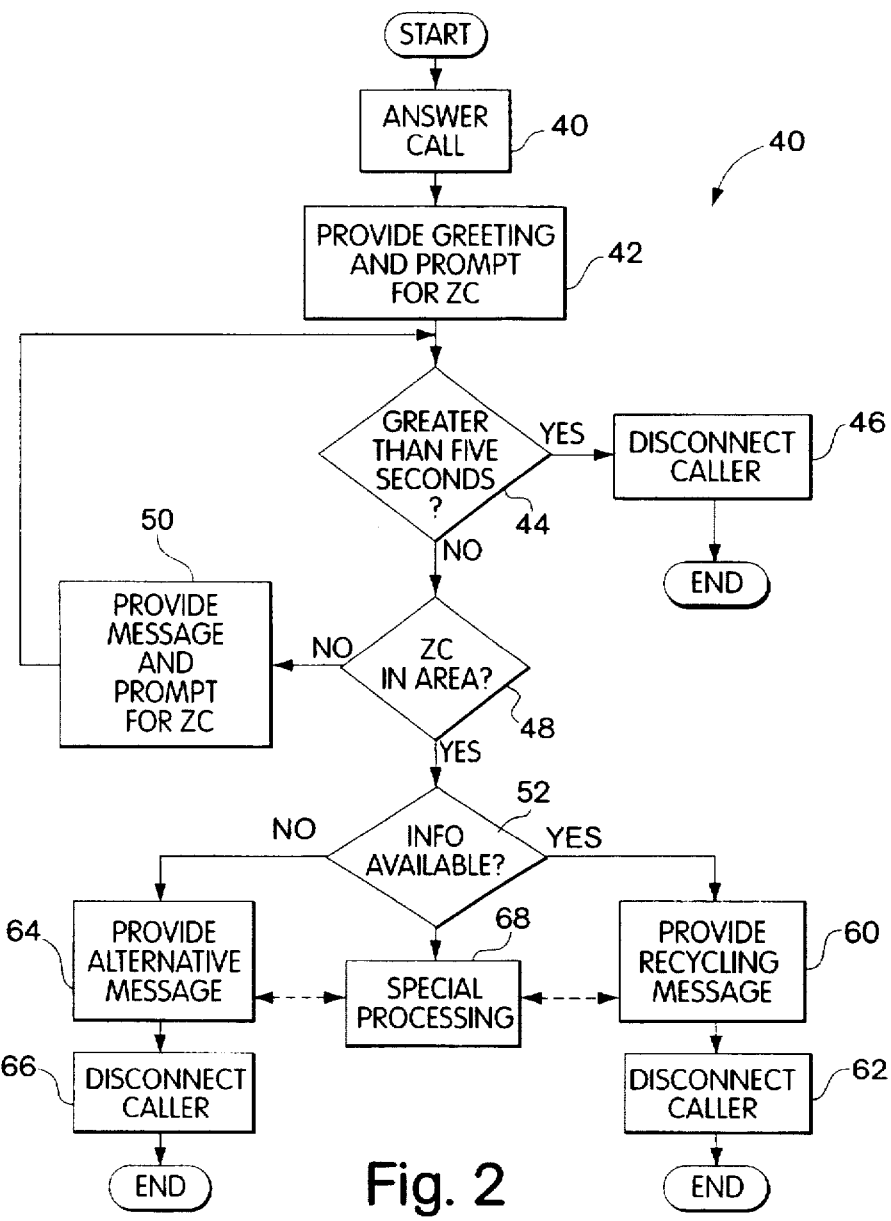
FIG. 2 is a flow chart illustrating operation of the telephone recycling system according to the invention.

Referring to FIG. 2, a flow chart 40 illustrates operation of the telephone recycling system 10. Operation begins at a first step 40 when the system 10 answers the incoming call. Following the step 40 is a step 42 where the user is provided with a greeting and prompted to enter his or her ZIP Code. The greeting is a prerecorded voice message welcoming the user to the system 10 and indicting that the system 10 provides recycling information. The greeting immediately puts a caller on notice so that a caller who inadvertently dialed into the system 10 who is not interested in recycling information can hang up. The user is also prompted to enter his or her ZIP Code at the step 42 using the touchtone keypad of the user's telephone. A user that does not have a touchtone telephone cannot use the system 10.

Following the step 42 is a decision step 44 which determines if the user has taken more than five seconds in which to enter five digits using the user's touchtone telephone keypad. Allowing the user only five seconds in which to enter the ZIP Code provides many advantages, including prohibiting the user from tying up the system 10 for too long. If at the step 44 the user has taken more than five seconds to enter his or her ZIP Code, then control passes from the step 44 to a step 46 where the system 10 disconnects the caller (i.e., hangs up the telephone). Once the caller has been disconnected at the step 46, processing for that particular call is complete.

If at the step 44 the user has not taken more than five seconds to enter his or her ZIP Code, then control passes from the step 44 to a test step 48 to determine if the ZIP Code entered by the user is within a predetermined geographic area. The predetermined geographic area could be any area for which the system 10 is configured to operate such as, for example, the state of Massachusetts. If it is determined at the test step 48 that the user has not entered a ZIP Code which is in the area serviced by the system 10, control passes from the test step 48 to a step 50 where the user is provided with a message indicating that the entered ZIP Code is outside the area serviced by the system 10. In addition, the user is prompted at the step 50 to re-enter the ZIP Code or enter a different ZIP Code. Following the step 50, control passes back to the step 44, which is discussed above.

If at the step 48 it is determined that the ZIP Code entered by the user is in the area serviced by the system 10, then control passes from the step 48 to a test step 52 to determine if there is recycling information available on the system 10 for the specific ZIP Code entered by the user. If so, then control transfers from the test step 52 to a step 60 where the user is provided with a recycling message for the area corresponding to the ZIP Code entered by the user. The recycling message can be any information appropriate for recycling in the area corresponding to the ZIP Code entered by the user, and typically includes locations and hours of operation for recycling centers within the area. The particular message that is provided for each ZIP Code is entered into the system 10 in a manner described in more detail hereinafter. Following the step 60 is a step 62 where the caller is disconnected from the system, after which processing is complete. The user can be provided with an appropriate sign-off message at the step 62.

If at the test step 52 it is determined that there is no recycling information available for the particular ZIP Code entered by the user, then control transfers from the test step 52 to a step 64 where the user is provided with an alternative message. The alternative message typically indicates to the user that no recycling information is available for the area corresponding to the ZIP Code entered by the user. Following the step 64 is a step 66 where the user is disconnected from the system 10, after which processing is complete. The user can be provided with an appropriate sign-off message at the step 66.

It is possible for an authorized user to change the message provided at the step 60 or the step 64 by pressing an asterisk key while the message at the steps 60, 64 is being provided. In that case, control transfers from either the step 60 or the step 64 to a step 68 wherein special processing occurs to allow the authorized user to provide the prerecorded message that is heard by the users at the steps 60, 64. Once an authorized user has entered a new prerecorded message for a particular ZIP Code at the step 68, subsequent users that access the system 10 will hear the new message when they enter the same ZIP Code.

Figure 3:
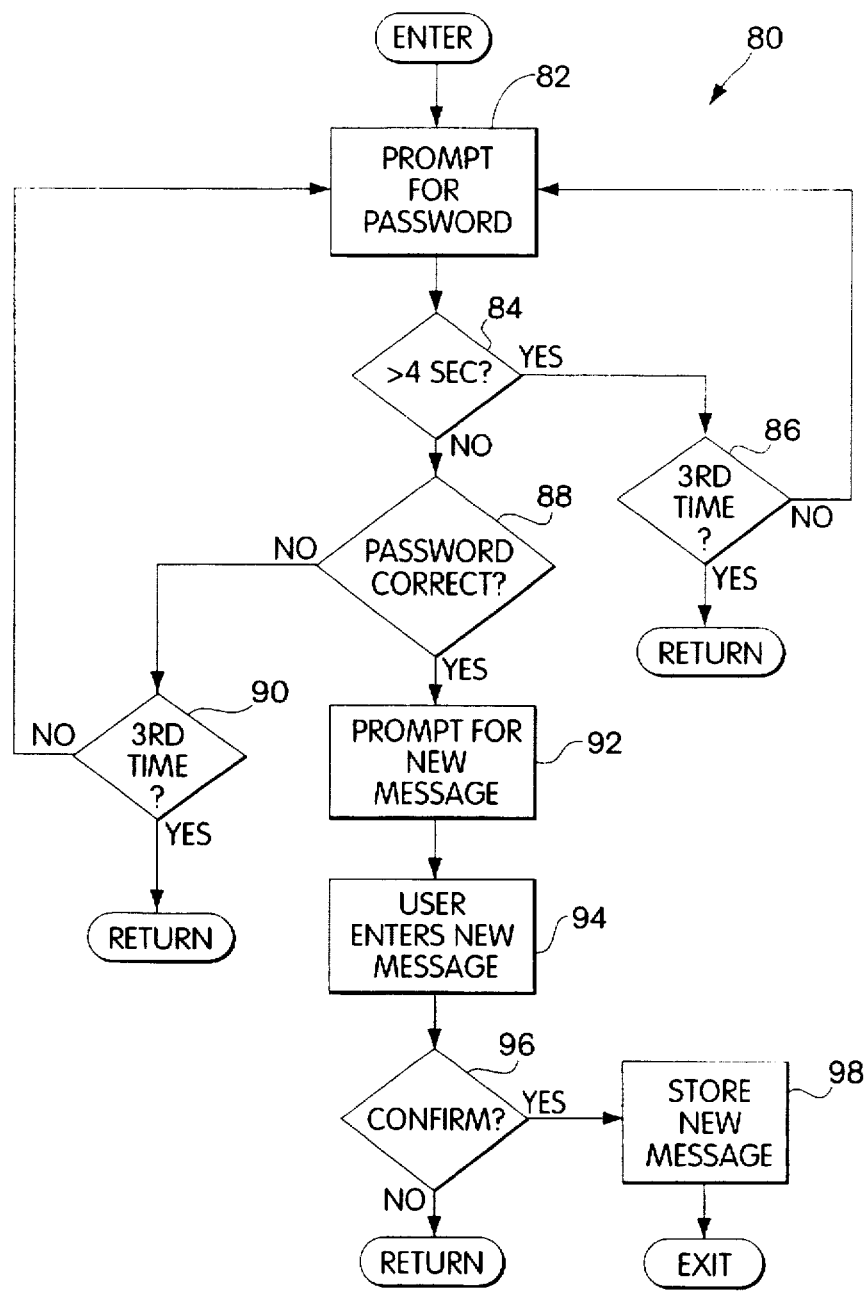
FIG. 3 is a flow chart showing special processing for performing administrative functions of the telephone recycling system.

Referring to FIG. 3, a flow chart 80 illustrates processing at the special processing step 68 of FIG. 2. Processing begins at a first step 82 where the authorized user is prompted to enter a numerical password via the touchtone telephone keypad. In order to provide message changing capability only to authorized users, the system 10 requires a password for an authorized user to record a message. Note also that each separate ZIP Code is provided with a separate password so that, for example, someone that is authorized only to change messages for one particular ZIP Code cannot inadvertently change messages for other ZIP Codes. The passwords for each of the different ZIP Codes are stored on the disk 20 of the system 10. The password-only access capability is provided by the Hello! messaging software that runs on the system 10. The passwords can be changed by an overall system administrator having access/authorization for the entire system 10.

Following the step 82 is a test step 84 which determines if the user has taken more than four seconds to enter the first digit of the password. If so, then control transfers from the test step 84 to a test step 86 to determine if the user has failed three times to provide the first digit of the input within four seconds. If so, then the user exits the special processing and returns to either the step 60 or the step 64 of FIG. 2, depending on which of the steps 60, 64 was being executed when the special processing was invoked. Returning to the step 60 or the step 64 in this manner does not change the prerecorded message that is heard by subsequent users.

If it is determined at the step 86 that the user has not delayed three times in providing a response to the prompt at the step 82, then control transfers from the step 86 back to the step 82 where the user is again prompted to enter the password. If the user enters a password within four seconds, then control transfers from the step 84 to a test step 88 to determine if the user has provided a correct password. If not, then control transfers from the step 88 to a test step 90 to determine if the user has failed three times to provide a correct password. If so, then the test step 90 causes the user to exit the special processing 68 back to either the step 60 or the step 64. Otherwise, control transfers from the step 90 back to the step 82 where the user is again prompted to enter a password. Note that the steps 82, 84, 86, 88, 90 provide a mechanism for prompting the user for a password and allowing the user up to three opportunities to enter the correct password in a timely fashion.

If it is determined at the step 88 that the authorized user has provided a correct password, control transfers from the test step 88 to a step 92 where the authorized user is prompted to enter the new prerecorded message that will be provided at the step 60 or at the step 64 of FIG. 2. Following the step 92 is a step 94 where the authorized user enters the new recorded message by speaking into the telephone handset in a conventional manner.

Following the step 94 is a test step 96 where the authorized user is prompted to confirm entry of the new message and where the authorized user indicates acceptance of the new message by pressing a particular key on the touchtone telephone (such as pressing the "1" touchtone telephone key). If the authorized user confirms acceptance of the new message, control transfers from the step 96 to a step 98 where the new message is stored on the disk 20 of the system 10. If, on the other hand, the authorized user does not confirm acceptance of the message at the step 96, then the step 98 where the message is stored on the disk 20 is not executed and the message is not changed. This could occur if, for example, the user records a new message and then decides not to change the message after all. Following the step 96, control transfers from the special processing step 68 of FIG. 2 to either the step 60 or the step 64, as appropriate. However, following the step 98, the system 10 disconnects (i.e., hangs up) the user and processing is complete.

In some instances, a particular message will be appropriate for more than one ZIP Code. For example, if a municipality has more than one ZIP Code, but only a single recycling center/program, then the message provided to residents in any one of the municipality's ZIP Codes will be appropriate for residents in any one of the others of the municipality's ZIP Codes. Accordingly, the system 10 is configured such that an authorized user entering a new message at the step 68 can enter a single message for a single ZIP Code and have that message played back for not only that ZIP Code, but also for other related ZIP Codes. This is accomplished by configuring the system 10 to store information on the disk 20 indicating which ZIP Codes are related. This information can be determined by consulting a ZIP Code reference for each of the ZIP Codes in the area serviced by the system 10. Then, when an authorized user accesses the system 10 to change the prerecorded message at the step 68, the user enters, for example, the numerically lowest of the related ZIP Codes and provides the prerecorded message. The system 10 then uses the information stored therein regarding related ZIP Codes to provide that same message to users who access the system 10 and enter any one of the related ZIP Codes.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A telephone recycling system, comprising:
   answering means for answering an incoming telephone call placed by a user;
   prompting means, coupled to said answering means, for prompting the user to enter a ZIP Code via the user's touchtone telephone keys;
   first messaging means, for providing the user with a recycling voice message that varies according to the ZIP Code entered by the user, wherein the recycling message is provided directly in response to the ZIP Code, without the user having to provide additional input;
   second messaging means for providing an alternative message is the recycling message is now available; and
   means for detecting a signal for updating the recycling message while the recycling message is provided to the user and for updating the alternative message while the alternative message is provided to the user.

2. A telephone recycling system, according to claim 1, further comprising:
   message storing means, coupled to said answering means, for allowing authorized users to telephone the system and modify one or more of the recycling messages.

3. A telephone recycling system, according to claim 2, wherein said message storing means is also coupled to said messaging means and wherein the user accesses said message storing means by pressing a predefined key of the user's touchtone telephone while the user is being provided with the recycling message.

4. A telephone recycling system, according to claim 3, wherein said predefined key is the asterisk key.

5. A telephone recycling system, comprising;
   storing means for storing a plurality of recycling voice messages associated with a plurality of ZIP Codes, wherein at least one of the stored recycling voice messages is associated with at least two ZIP Codes;
   answering means for answering an incoming telephone call placed by a user;,
   prompting means, coupled to said answering means, for prompting the user to enter a ZIP Code via the user's touchtone telephone keys;
   first messaging means for providing the user with the recycling voice message associated with the ZIP Code entered by the user;
   second messaging means for providing an alternative message if the recycling message is not available; and
   means for detecting a signal for updating the recycling message while the recycling message is provided to the user and for updating the alternative message while the alternative message is provided to the user.

6. A telephone recycling system, according to claim 5, further comprising:
   message storing means, coupled to said answering means, for allowing authorized users to telephone the system and modify one or more of the recycling messages.

7. A telephone recycling system, according to claim 6, wherein said message storing means is also coupled to said messaging means and wherein the user accesses said message storing means by pressing a predefined key of the user's touchtone telephone while the user is being provided with the recycling message.

8. A telephone recycling system, according to claim 7, wherein said predefined key is the asterisk key.

9. A telephone recycling system, according to claim 5, wherein said first messaging means provides the user with the recycling voice message immediately without the user having to provide additional input and without the user being placed in a queue.

10. A telephone recycling system, according to claim 5, wherein said first messaging means provides the user with the recycling voice message immediately without the user having to provide additional input and without the user having to wait for time to expire.

11. A telephone recycling system according to claim 5, wherein said first messaging means provides the user with the recycling voice message immediately without the user having to provide additional input and without the user having to wait for additional users to access the system.

12. A telephone recycling system, according to claim 5, wherein said first messaging means provides the user with the recycling voice message independently of other users.

13. A telephone recycling system, according to claim 5, wherein said storing means stores at least one recycling voice message associated with at least two ZIP Codes from the same town and wherein the stored recycling voice message includes information about the location of a single recycling facility located within the town.

14. A telephone recycling system, according to claim 5, wherein said storing means stores a plurality of recycling voice messages associated with a plurality of ZIP Codes within a single state.

15. A method of providing telephone recycling messages, comprising
   storing a plurality of recycling voice messages associated with a plurality of ZIP Codes, wherein at least one of the stored recycling voice messages is associated with at least two ZIP Codes;
   answering an incoming telephone call placed by a user,
   prompting the user to enter a ZIP Code via the uses touchtone telephone keys;
   providing the user with the recycling voice message associated with the ZIP Code entered by the user directly without the user having to provide additional input;
   providing an alternative message if the recycling voice message is not available; and
   detecting a signal for updating the recycling message while the recycling voice message is provided to the user and for updating the alternative message while the alternative message is provided to the user.

16. A method according to claim 15, wherein storing includes storing a recycling voice message associated with a plurality of related ZIP Codes.

17. A method according to claim 15, wherein storing includes storing a recycling voice message associated with a plurality of ZIP Codes from a single town.

18. A method according to claim 15, wherein storing includes storing a recycling voice message that includes information identifying the location of a single recycling facility within a town and wherein the recycling voice message is associated with a plurality of ZIP Codes from the town.

19. A method according to claim 15, wherein detecting a signal includes allowing authorized users to modify one or more of the recycling voice messages by telephone.

20. A method according to claim 15, wherein providing the user with the recycling voice message includes providing the user with information that includes the location and hours of operation for a recycling center in the area corresponding to the ZIP Code entered by the user.

* * * * *